(12) United States Patent
Lekatsas et al.

(10) Patent No.: US 9,022,602 B2
(45) Date of Patent: May 5, 2015

(54) MODULAR MULTICHANNEL CONNECTOR SYSTEM AND METHOD

(71) Applicants: Nicholas Lekatsas, Malden, MA (US); Biju Antony, Lynnfield, MA (US); David Lidrbauch, Beverly, MA (US)

(72) Inventors: Nicholas Lekatsas, Malden, MA (US); Biju Antony, Lynnfield, MA (US); David Lidrbauch, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 206 days.

(21) Appl. No.: 13/924,961

(22) Filed: Jun. 24, 2013

(65) Prior Publication Data

US 2014/0063804 A1    Mar. 6, 2014

Related U.S. Application Data

(60) Provisional application No. 61/694,050, filed on Aug. 28, 2012.

(51) Int. Cl.
| | |
|---|---|
| *F21V 23/06* | (2006.01) |
| *F21V 19/00* | (2006.01) |
| *H05B 33/08* | (2006.01) |

(52) U.S. Cl.
CPC ............. *F21V 23/06* (2013.01); *F21V 19/00* (2013.01); *Y10T 29/49124* (2015.01); *Y10T 29/49126* (2015.01); *H05B 33/0803* (2013.01)

(58) Field of Classification Search
USPC .......................... 362/249.01, 249.06
See application file for complete search history.

(56) References Cited

U.S. PATENT DOCUMENTS

2013/0049462 A1*  2/2013  Chen et al. ................... 307/18
2014/0268781 A1*  9/2014  Dau et al. ................. 362/249.06

* cited by examiner

*Primary Examiner* — Sikha Roy
(74) *Attorney, Agent, or Firm* — Shaun P. Montana

(57) ABSTRACT

Modular multichannel light sources connector systems and methods are provided. A lighting assembly includes substrates, each with a respective plurality of ports and conductive path configurations. Each path configuration includes a plurality of conductive paths between the respective plurality of ports. At least two conductive path configurations are the same. A connector couples one of a plurality of first ports on a first substrate to one of a plurality of second ports on a second substrate. A multichannel power supply's outputs are each coupled to an associated conductive path on the first substrate. A first light source is coupled to two conductive paths on the first substrate, and to a first output. A second light source is coupled to two conductive paths on the second substrate, corresponding to the conductive paths on the first substrate, and to a second output, different from the first output.

15 Claims, 9 Drawing Sheets

MODULAR MULTICHANNEL CONNECTOR SYSTEM AND METHOD

CROSS-REFERENCE TO RELATED APPLICATION

The present application claims priority of U.S. Provisional Patent Application No. 61/694,050, filed Aug. 28, 2012 and entitled "MODULAR MULTICHANNEL CONNECTOR SYSTEM", the entire contents of which are hereby incorporated by reference.

TECHNICAL FIELD

The present invention relates to lighting, and more specifically, to connectors between light sources and power supplies.

BACKGROUND

Solid state light sources may include different groups of solid state light sources, e.g., connected serially or in parallel or in combinations thereof, arranged on a substrate to provide a desired composite light output pattern, intensity and/or color. The groups may be coupled to separate associated output channels of a multichannel power supply, so that each group is driven by an appropriate drive current. The separate output channels of the multichannel power supply may be coupled to the light sources by separate associated wiring harnesses, or may be coupled to separate and different substrates to which the light sources are coupled.

SUMMARY

As the cost of solid state light sources drops, the cost of connectors for connecting the output channels of a multichannel power supply to the light sources becomes a significant component of the total cost. In addition, achieving variations in the arrangement of the light sources has involved use of multiple different substrate configurations. Designing and stocking different substrate configurations to achieve different connectivity patterns for the light sources is costly and inefficient.

Embodiments described herein provide for connectivity of multiple solid state light sources to different channels of a multichannel power supply using a combination of substrates. Each substrate has an identical conductive path configuration that establishes pass-through and shifting connections, and each solid state light source(s) may be coupled between the same conductive paths on separate substrates. The conductive paths on separate substrates may be coupled to each other using associated connectors and the output channels of the multichannel power supply may be coupled to the conductive paths on one of the substrates. The conductive paths on the separate, identically configured substrates and the connectors may couple the solid state light sources on the substrates to different channels of the multichannel power supply.

Embodiments may thus reduce the number of wiring harnesses needed to connect the channels of a multichannel power supply to different solid state light sources to a single wiring harness connected to a single substrate. The other substrates may be connected to each other by relatively inexpensive board-to-board connectors. This may significantly reduce the cost associated with connectors in systems employing multiple substrates. In addition, use of a combination of substrates, all of which have an identical conductive path configuration, to achieve connectivity of multiple solid state light sources to different channels of a multichannel power supply avoids the need to stock multiple different substrate configurations to achieve different light source configurations. Embodiments thus allow for cost-effective, variable configurations for driving different solid state light sources with different channels of a multichannel power supply.

In an embodiment, there is provided a lighting assembly. The lighting assembly includes: a plurality of substrates, wherein: a first substrate in the plurality of substrates comprises a plurality of first ports and a first conductive path configuration comprising a plurality of first conductive paths between the plurality of first ports; and a second substrate in the plurality of substrates comprises a plurality of second ports and a second conductive path configuration comprising a plurality of second conductive paths between the second plurality of ports, wherein the first conductive path configuration and the second conductive path configuration are the same; a connector coupling one of the plurality of first ports to one of the plurality of second ports; a multichannel power supply configured to provide a plurality of outputs, each output in the plurality of outputs being coupled to an associated one of the plurality of first conductive paths; a first light source coupled to a first conductive path of the first plurality of conductive paths, to a second conductive path of the first plurality of conductive paths, and to a first output channel of the multichannel power supply; and a second light source coupled to a first conductive path of the second plurality of conductive paths and to a second conductive path of the second plurality of conductive paths, which correspond to the first and second conductive paths of the first plurality of conductive paths, wherein the second light source is coupled to a second output channel of the multichannel power supply, and wherein the second output channel is different from the first output channel.

In a related embodiment, the plurality of first ports may include a first port having a first set of electrical contacts; a second port having a second set of electrical contacts; a third port having a third set of electrical contacts; and a fourth port having a fourth set of electrical contacts; wherein the first conductive path configuration may establish a pass-through connection from the first port to the third port and a shifting connection from the second port to the fourth port, wherein the pass-through connection may couple each of the first set of electrical contacts to associated ones of the third set of electrical contacts, wherein the shifting connection may couple a portion of the second set of electrical contacts to associated ones of the fourth set of electrical contacts with at least one contact of the second set of electrical contacts not being connected to any contact of the fourth set of electrical contacts.

In a further related embodiment, the first set of electrical contacts may present an associated electrical connection to the first conductive path configuration in a first order relative to each other and the third set of electrical contacts may present an associated electrical connection to the first conductive path configuration in a third order relative to each other, wherein the first order may be the same relative order as the third order.

In another further related embodiment, the second set of electrical contacts may present an associated electrical connection to the first conductive path configuration in a second order relative to each other and the fourth set of electrical contacts may present an associated electrical connection to the first conductive path configuration in a fourth order relative to each other, wherein the fourth order may be a different order from the second order.

In yet another further related embodiment, the plurality of first ports may include a fifth port having a fifth set of electrical contacts, wherein each contact of the fifth set of electrical contacts may be coupled to the pass-through connection.

In another related embodiment, the multichannel power supply may be coupled directly to a port in the plurality of first ports.

In another embodiment, there is provided an electrical substrate. The electrical substrate includes: a first port having a first set of electrical contacts; a second port having a second set of electrical contacts; a third port having a third set of electrical contacts; a fourth port having a fourth set of electrical contacts; and a conductive path configuration establishing a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts.

In a related embodiment, the first set of electrical contacts may present an associated electrical connection to the conductive path configuration in a first order relative to each other and the third set of electrical contacts may present an associated electrical connection to the conductive path configuration in a third order relative to each other, the first order may be the same relative order as the third order.

In another related embodiment, the second set of electrical contacts may present an associated electrical connection to the conductive path configuration in a second order relative to each other and the fourth set of electrical contacts may present an associated electrical connection to the conductive path configuration in a fourth order relative to each other, the fourth order may be a different relative order from the second order.

In still another related embodiment, the electrical substrate may further include a fifth port having a fifth set of electrical contacts, each contact of the fifth set of electrical contacts may be coupled to the pass-through connection.

In another embodiment, there is provided a method. The method includes: providing a plurality of substrates, each of the plurality of substrates having a plurality of ports and the same conductive path configuration thereon; coupling output channels of a multichannel power supply to a first substrate in the plurality of substrates; coupling a first port in the plurality of ports on the first substrate in the plurality of substrates to a first port in the plurality of ports on a second substrate in the plurality of substrates; coupling a first solid state light source to first and second conductive paths of the conductive path configuration on the first substrate in the plurality of substrates, whereby the first solid state light source is coupled to a first output channel of the multichannel power supply; and coupling a second solid state light source to first and second conductive paths of the conductive path configuration on the second substrate in the plurality of substrates corresponding to the first and second conductive paths of the conductive path configuration on the first substrate in the plurality of substrates, whereby the second solid state light source is coupled to a second output channel of the multichannel power supply, the second output channel being different from the first output channel.

In a related embodiment, coupling a first port may include coupling a first port in the plurality of ports on the first substrate in the plurality of substrates to a first port in the plurality of ports on a second substrate in the plurality of substrates, wherein the plurality of ports on the first substrate in the plurality of substrates may include: a first port having a first set of electrical contacts; a second port having a second set of electrical contacts; a third port having a third set of electrical contacts; and a fourth port having a fourth set of electrical contacts; wherein the conductive path configuration may establish a pass-through connection from the first port to the third port and a shifting connection from the second port to the fourth port, wherein the pass-through connection may couple each of the first set of electrical contacts to associated ones of the third set of electrical contacts, and wherein the shifting connection may couple a portion of the second set of electrical contacts to associated ones of the fourth set of electrical contacts with at least one contact of the second set of electrical contacts not being connected to any contact of the fourth set of electrical contacts.

In a further related embodiment, coupling a first port may include coupling a first port in the plurality of ports on the first substrate in the plurality of substrates to a first port in the plurality of ports on a second substrate in the plurality of substrates, wherein the plurality of ports on the first substrate in the plurality of substrates may include: a first port having a first set of electrical contacts; a second port having a second set of electrical contacts; a third port having a third set of electrical contacts; and a fourth port having a fourth set of electrical contacts; wherein the conductive path configuration may establish a pass-through connection from the first port to the third port and a shifting connection from the second port to the fourth port, wherein the pass-through connection may couple each of the first set of electrical contacts to associated ones of the third set of electrical contacts, and wherein the shifting connection may couple a portion of the second set of electrical contacts to associated ones of the fourth set of electrical contacts with at least one contact of the second set of electrical contacts not being connected to any contact of the fourth set of electrical contacts; and wherein the first set of electrical contacts may present an associated electrical connection to the conductive path configuration in a first order relative to each other and the third set of electrical contacts may present an associated electrical connection to the conductive path configuration in a third order relative to each other, the first order may be the same relative order as the third order.

In another further related embodiment, coupling a first port may include coupling a first port in the plurality of ports on the first substrate in the plurality of substrates to a first port in the plurality of ports on a second substrate in the plurality of substrates, wherein the plurality of ports on the first substrate in the plurality of substrates may include: a first port having a first set of electrical contacts; a second port having a second set of electrical contacts; a third port having a third set of electrical contacts; and a fourth port having a fourth set of electrical contacts; wherein the conductive path configuration may establish a pass-through connection from the first port to the third port and a shifting connection from the second port to the fourth port, wherein the pass-through connection may couple each of the first set of electrical contacts to associated ones of the third set of electrical contacts, and wherein the shifting connection may couple a portion of the second set of electrical contacts to associated ones of the fourth set of electrical contacts with at least one contact of the second set of electrical contacts not being connected to any contact of the fourth set of electrical contacts; and wherein the second set of electrical contacts may present an associated electrical connection to the conductive path configuration in a second order relative to each other and the fourth set of electrical contacts may present an associated electrical connection to the conductive path configuration in a fourth order relative to each other, the fourth order being a different order from the second order.

In still another further related embodiment, coupling a first port may include coupling a first port in the plurality of ports on the first substrate in the plurality of substrates to a first port in the plurality of ports on a second substrate in the plurality of substrates, wherein the plurality of ports on the first substrate in the plurality of substrates may include: a first port having a first set of electrical contacts; a second port having a second set of electrical contacts; a third port having a third set of electrical contacts; a fourth port having a fourth set of electrical contacts; and a fifth port having a fifth set of electrical contacts; wherein the conductive path configuration may establish a pass-through connection from the first port to the third port and a shifting connection from the second port to the fourth port, wherein the pass-through connection may couple each of the first set of electrical contacts to associated ones of the third set of electrical contacts, and wherein the shifting connection may couple a portion of the second set of electrical contacts to associated ones of the fourth set of electrical contacts with at least one contact of the second set of electrical contacts not being connected to any contact of the fourth set of electrical contacts; and wherein each contact of the fifth set of electrical contacts may be coupled to the pass-through connection.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

As used throughout, the term "solid state light source(s)" means one or more semiconductor-based lighting devices, such as but not limited to light emitting diodes (LEDs), organic light emitting diodes (OLEDs), polymer light emitting diodes (PLEDs), and/or other light emitting compounds and/or devices, whether singular or plural, in any known combinations. Further, as used throughout, the term "substrate" refers to a type of material capable of having electrical and/or electrochemical and/or optoelectronic connections attached thereto between electrical and/or electrochemical and/or optoelectronic devices, such as but not limited to printed circuit boards, flexible circuit boards, metal core circuit boards, flexible materials, and so on.

Figure 1:
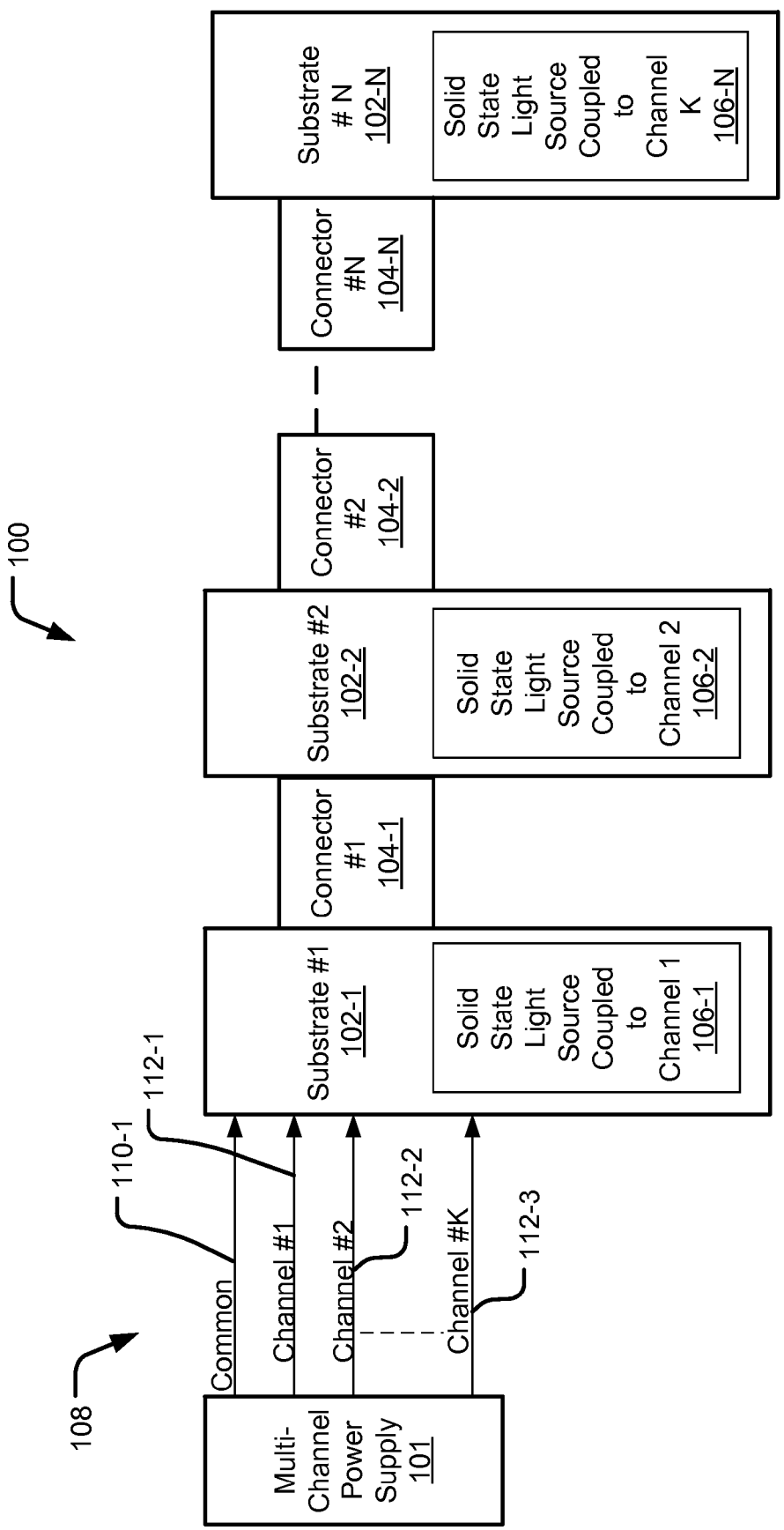
FIG. 1 is a block diagram of a system according to embodiments disclosed herein.

FIG. 1 diagrammatically illustrates a lighting system 100 that includes a multichannel power supply 101, a plurality of separate substrates 102-1, 102-2 . . . 102-N coupled to each other by associated connectors in a plurality of connectors 104-1, 104-2 . . . 104-N, and a plurality of solid state light sources 106-1, 106-2 . . . 106-N. Each of the solid state light sources in the plurality of solid state light sources 106-1, 106-2 . . . 106-N is coupled to an associated one of the substrates in the plurality of substrates 102-1, 102-2 . . . 102-N and to an associated one of the output channels 108 of the multichannel power supply 101. The multichannel power supply 101 may be, and in some embodiments is, a known power supply for providing multiple separate output channels 108. A variety of multichannel power supply configurations are well-known to those of ordinary skill in the art. In FIG. 1, the multichannel power supply 101 provides K output channels, each of which is established between a Common path 110-1 and a different associated Channel path 112-1, 112-2, 112-3. For example, the Kth output channel of the multichannel power supply 101 is established between the Common path 110-1 and the Channel #K path 112-3. The common path may be, and in some embodiments is, a common power path and the channel paths may be, and some embodiments are, common ground paths, or vice versa. Each output channel of the multichannel power supply 101 is configured to provide an associated drive current, such as but not limited to a constant current drive current, for driving one or more of the solid state light sources in the plurality of solid state light sources 106-1, 106-2 . . . 106-N.

The output channels 108 of the multichannel power supply 101 are directly coupled to associated conductive paths on one of the substrates in the plurality of substrates 102-1, 102-2 . . . 102-N. In FIG. 1, for example, the output channels 108 are directly coupled to a substrate #1 102-1. It is to be understood, however, that the output channels 108 of the multichannel power supply 101 may be, and in some embodiments are, directly coupled to any of the substrates in the plurality of substrates 102-1, 102-2 . . . 102-N depending on the desired configuration. Also, any known connector configuration may be used to directly couple output channels 108 to a substrate in the plurality of substrates 102-1, 102-2 . . . 102-N. The plurality of substrates 102-1, 102-2 . . . 102-N may, and in some embodiments do, include a known substrate with a conductive path configuration positioned on and/or through one of the substrates in the plurality of substrates 102-1, 102-2 . . . 102-N. As will be described in greater detail, each substrate in the plurality of substrates 102-1, 102-2 . . . 102-N has an identical conductive path configuration. In other words, a set of conductive paths on one of the substrates in the plurality of substrates 102-1, 102-2 . . . 102-N exists identically on all the other substrates in the plurality of substrates 102-1, 102-2 . . . 102-N. This allows for use of a single substrate configuration to be used for each of the substrates in the plurality of substrates 102-1, 102-2 . . . 102-N and avoids the need to provide different substrate configurations to build the lighting system 100.

The connectors in the plurality of connectors 104-1, 104-2 . . . 104-N may, and in some embodiments do, take any known connector configuration for coupling conductive paths on one substrate in the plurality of substrates 102-1, 102-2 . . . 102-N to conductive paths on another of the substrates in the plurality of substrates 102-1, 102-2 . . . 102-N. The connectors in the plurality of connectors 104-1, 104-2 . . . 104-N may be, and in some embodiments are, but are not limited to, known board-to-board connectors for coupling conductive paths on one substrate in the plurality of substrates 102-1, 102-2 . . . 102-N to conductive paths on an adjacent substrate in the plurality of substrates 102-1, 102-2 . . . 102-N without use of an associated wiring harness. For example, the board-to-board connectors may be Series 9159 connectors presently available from AVX Corporation of Greenville, S.C., USA, or SEI or SEL Series connectors presently available from Samtec Corporation of New Albany, Ind., USA.

Board-to-board connectors provide a cost-effective way to couple conductive paths from one substrate in the plurality of substrates 102-1, 102-2 . . . 102-N to an adjacent substrate in the plurality of substrates 102-1, 102-2 . . . 102-N without requiring use of a wiring harness. It is to be understood, however, that embodiments may include other connector types and configurations. In some embodiments, for example, it may be useful to configure one or more of the connectors in the plurality of connectors 104-1, 104-2 . . . 104-N as a wiring harness for coupling conductive paths of substrates in the plurality of substrates 102-1, 102-2 . . . 102-N that are physically separated from each other in a manner that does not allow for efficient use of a board-to-board connector.

Each of the solid state light sources in the plurality of solid state light sources 106-1, 106-2 . . . 106-N may, and in some embodiments do, include groups of solid state light sources configured to emit the same or different colors interconnected in series and/or parallel configurations. As used herein, the term "color" generally refers to a property of radiation that is perceivable by an observer (though this usage is not intended to limit the scope of this term). Accordingly, the term "different colors" implies two different spectra with different dominant wavelengths and/or bandwidths. In addition, "color" may be used to refer to white and non-white light. Each solid state light source in the plurality of solid state light sources 106-1, 106-2 . . . 106-N may include the same, or different, configuration as others of the solid state light sources in the plurality of solid state light sources 106-1, 106-2 . . . 106-N. In FIG. 1, each of the solid state light sources in the plurality of solid state light sources 106-1, 106-2 . . . 106-N is coupled to an associated one of the substrates in the plurality of substrates 102-1, 102-2 . . . 102-N and is conductively coupled through the associated substrate in the plurality of substrates 102-1, 102-2 . . . 102-N to a different associated channel 108 of the multichannel power supply 101. In some embodiments, the solid state light sources in the plurality of solid state light sources 106-1, 106-2 . . . 106-N are coupled to the same conductive paths on different ones of the substrates in the plurality of substrates 102-1, 102-2 . . . 102-N while achieving connectivity to different channels 108 of the multichannel power supply 101. The substrates in the plurality of substrates 102-1, 102-2 . . . 102-N may be, and in some embodiments are, connected to each other using the connectors in the plurality of connectors 104-1, 104-2 . . . 104-N, and one of the substrates in the plurality of substrates 102-1, 102-2 . . . 102-N may be directly coupled to the multichannel power supply 101. This allows for efficient assembly of the lighting system 100 wherein multiple solid state light sources in the plurality of solid state light sources 106-1, 106-2 . . . 106-N are coupled to different channels 108 of a multichannel power supply 101.

Although in FIG. 1, each solid state light source in the plurality of solid state light sources 106-1, 106-2 . . . 106-N is coupled to an associated one of the substrates in the plurality of substrates 102-1, 102-2 . . . 102-N and to a separate channel 108 of the multichannel power supply 101, any number of solid state light sources may be coupled to a single substrate in the plurality of substrates 102-1, 102-2 . . . 102-N. Also, the solid state light sources in the plurality of solid state light sources 106-1, 106-2 . . . 106-N on the same or different substrates in the plurality of substrates 102-1, 102-2 . . . 102-N may be coupled to the same or different channels 108 of the multichannel power supply 101. Depending on the output capabilities of the multichannel power supply 101, a lighting system may, and in some embodiments does, include any number N of substrates 102-1, 102-2 . . . 102-N with any number of light sources 106-1, 106-2 . . . 106-N coupled to any number K of output channels 108 of the multichannel power supply 101.

Figure 2:
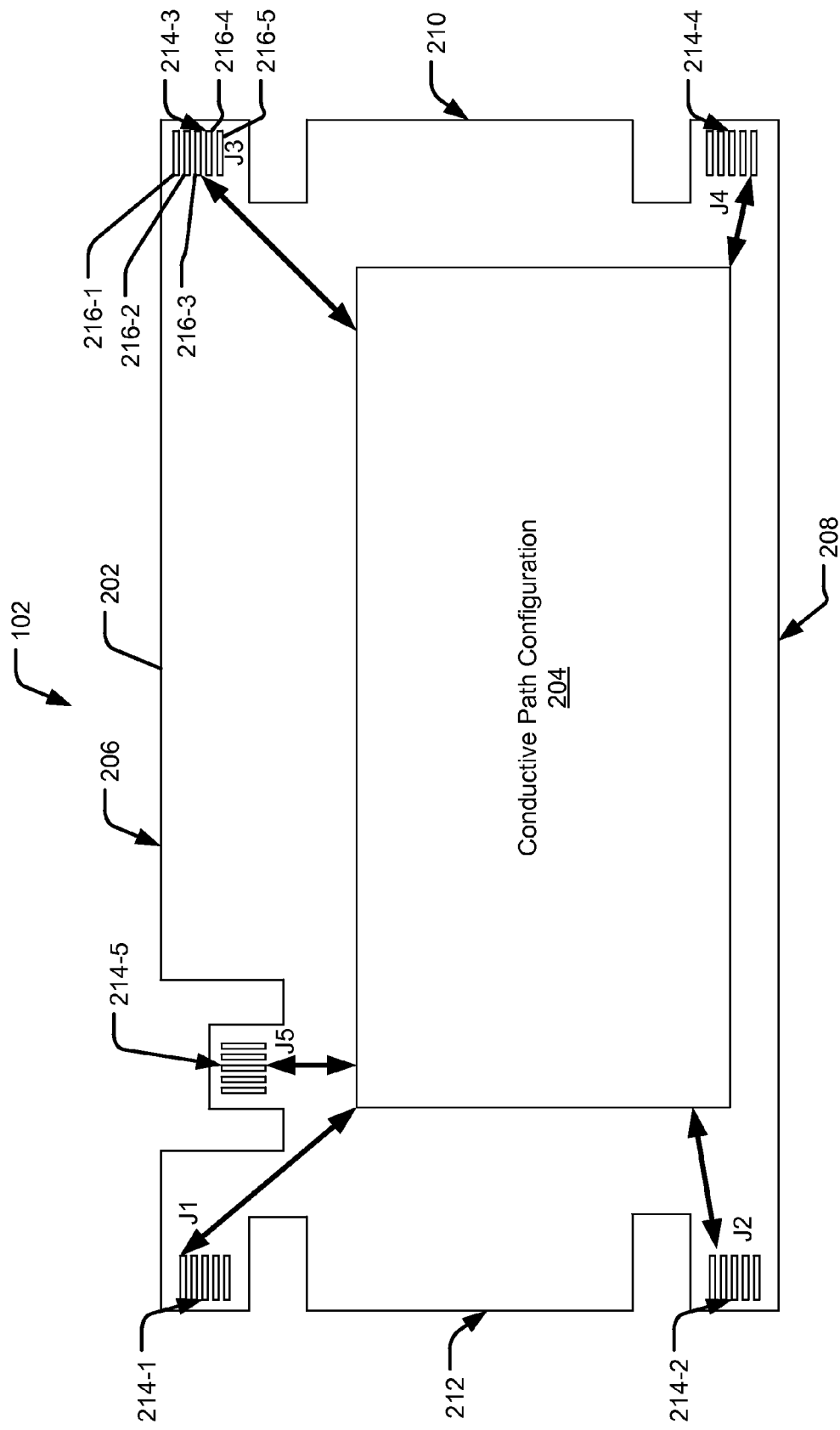
FIG. 2 diagrammatically illustrates a top view of a substrate according to embodiments disclosed herein.

Turning now to FIG. 2, there is illustrated a top view of a substrate 102, which includes a substrate 202, a plurality of input/output (I/O) ports J1, J2, J3, J4 and J5, and a conductive path configuration 204 formed on the substrate 202. As used herein, references to conductive paths or a conductive path configuration formed "on" a substrate refers to conductive paths on a surface of the substrate 202 and/or between surfaces of the substrate 202 and/or conductive paths extending completely or partially through the substrate 202. For ease of explanation, the substrate 102 will be referred to as including a top edge 206, a bottom edge 208, a right edge 210 and a left edge 212. References herein to top, bottom, left and right are not meant to be limiting, but rather are to provide a frame of reference to simplify understanding of the figure. In FIG. 2, I/O ports J1 and J2 are provided at the left edge 212, with the I/O port J1 adjacent the top edge 206 and the I/O port J2 adjacent the bottom edge 208. I/O ports J3 and J4 are provided at the right edge 210, with the I/O port J3 adjacent the top edge 206 and the I/O port J4 adjacent the bottom edge 208. I/O port J5 is provided at the top edge 206 adjacent the left edge 212. Each of the I/O ports J1, J2, J3, J4 and J5 includes an associated set of conductive contacts 214-1, 214-2, 214-3, 214-4, 214-5, respectively, positioned at one of the edges 206, 208, 210 or 212 of the substrate 102 to facilitate coupling of each of the contacts in the set of conductive contacts 214-1, 214-2, 214-3, 214-4, 214-5 to a corresponding pin or conductive contact on a connector in the plurality of connectors 104-1, 104-2 . . . 104-N (shown in FIG. 1) or to a corresponding output of the multichannel power supply 101. Each of the five I/O ports J1, J2, J3, J4 and J5 includes five separate contacts, e.g., contacts 216-1, 216-2, 216-3, 216-4 and 216-5 at the I/O port J3, exposed on the top surface of the substrate 102. It is to be understood, however, a substrate 102 according to embodiments disclosed throughout may, and sometimes does, include any number of I/O ports and the I/O ports may be, and sometimes are, positioned at any location on the substrate 102. A substrate 102 according to embodiments may, and sometimes does, include any number of conductive contacts sufficient for coupling all the output channels of a multichannel power supply to the substrate 102. For example, a multichannel power supply having two channels established between a common path and different associated channel paths may be connected to the substrate using three contacts at each port of the substrate 102.

The conductive path configuration 204 provides conductive paths between the I/O ports J1, J2, J3, J4 and J5, establishing a pass-through connection between at least two of the I/O ports J1, J2, J3, J4 and J5 and conductive paths establishing a shifting connection between at least two other I/O ports J1, J2, J3, J4 and J5. In general, a pass-through connection couples all of the signals coupled to the contacts at one I/O port, e.g. the I/O port J1, to associated contacts of another I/O port, e.g. the I/O port J2. In some embodiments, the pass-through connection couples all of the signals coupled to the contacts at one I/O port to associated contacts of another I/O port so they are presented to the other I/O port for connection in the same relative order as they were provided to the first I/O port. This allows a common connector type to be used for establishing a pass-through connection from an I/O port on one substrate to an I/O port on another substrate.

The terms "present" or "presenting" as used herein when referring to contacts (such as but not limited to the contacts 214-1, 214-2, 214-3, 214-4, 214-5) of an I/O port (such as but not limited to the I/O ports J1, J2, J3, J4 or J5) means that the contacts make electrical connections available on the substrate 102, e.g. at one of the edges 206, 208, 210 or 212 of the substrate 202, so that a connector in the plurality of connectors 104-1, 104-2 . . . 104-N (shown in FIG. 1), such as but not limited to a board-to-board connector, may be physically and electrically coupled therewith. The term "order" as used herein when referring to contacts means that the contacts (such as but not limited to the contacts 216-1, 216-2, 216-3, 216-4 and 216-5), within a set of contacts at an I/O port (such as but not limited to the I/O ports J1, J2, J3, J4 or J5) are physically ordered to present an electrical connection to conductive paths of the conductive path configuration 204 such that the contacts associated with and coupled to different paths are arranged to be physically immediately adjacent each other in an associated order. The term "same relative order" as used herein when referring to the contacts (such as but not limited to the contacts 214-1, 214-2, 214-3, 214-4, 214-5) of different I/O ports (such as but not limited to the I/O ports J1, J2, J3, J4 or J5) means that the contacts of a first I/O port present electrical connections to the conductive paths of the conductive path configuration 204 in a first order, and the contacts of a second I/O port present electrical connections to the conductive paths of the conductive path configuration 204 in a second order, such that the each of the contacts of the first I/O port is positioned immediately adjacent one or more other contacts of the first I/O port coupled to associated conductive paths of the conductive path configuration 204, and each contact of the second I/O port is positioned immediately adjacent one or more other contacts of the second I/O port coupled to the same conductive paths.

A shifting connection couples only some of the signals coupled to the contacts at one I/O port, e.g. the I/O port J2, to associated contacts of another I/O port, e.g. the I/O port J4. In some embodiments, a shifting connection couples only some of the signals coupled to the contacts at one I/O port, e.g. the I/O port J2, to associated contacts of another I/O port, e.g. the I/O port J4, so that the contacts are presented at the second I/O port in a different relative order compared to how the contacts were presented at the first I/O port. This allows a common connector type to be used for establishing a shifting connection from an I/O port on one substrate to an I/O port on another substrate, whereby the shifting connection couples the conductive paths on one substrate to different paths on the other substrate. Contacts present electrical connections in a "different" relative order as used herein means that the contacts 214-1, 214-2, 214-3, 214-4, 214-5 of a first I/O port in the plurality of I/O ports J1, J2, J3, J4, J5 present electrical connections to the conductive paths of a conductive path configuration 204 in an associated order, and the contacts 214-1, 214-2, 214-3, 214-4, 214-5 of a second I/O port in the plurality of I/O ports J1, J2, J3, J4, J5 present electrical connections to the conductive paths of the conductive path configuration 204 in a second order, such that the contacts of the first I/O port and second I/O port are immediately adjacent contacts coupled to different electrical paths, or a contact of one I/O port is not coupled to any electrical path.

Figure 3:
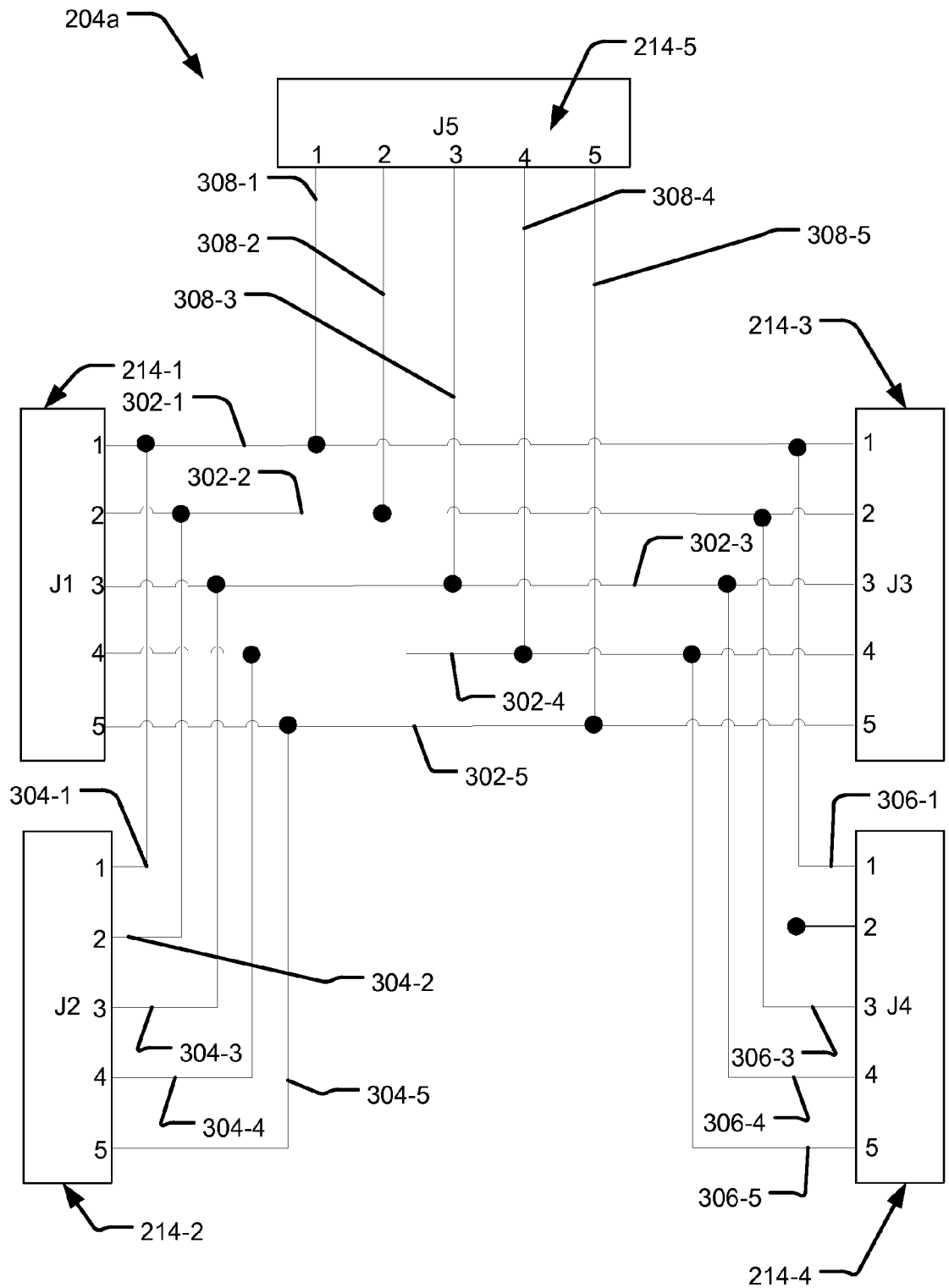
FIG. 3 is a diagram of a conductive path configuration on a substrate according to embodiments disclosed herein.

FIG. 3 illustrates one configuration of a conductive path configuration 204a that may be provided on the substrate 102 illustrated in FIG. 2. FIG. 3 shows each of the I/O ports in the plurality of I/O ports J1, J2, J3, J4, J5 with the contacts 214-1, 214-2, 214-3, 214-4, 214-5 associated with each I/O port in the plurality of I/O ports J1, J2, J3, J4, J5, respectively, identified by numerals 1 through 5. In general, the configuration of FIG. 3 establishes pass-through connections between the I/O ports J1 and J3, the I/O ports J1 and J2, the I/O ports J1 and J5, the I/O ports J2 and J3, the I/O ports J2 and J5, and the I/O ports J3 and J5, and a shifting connection between the I/O ports J1 and J4, the I/O ports J2 and J4, and the I/O ports J5 and J4. For ease of explanation, embodiments described herein will refer to the pass-through connection between the I/O ports J1 and J3 and the shifting connection between the I/O ports J2 and J4. Pass-through and shifting connections between other I/O ports in the plurality of I/O ports J1, J2, J3, J4, J5 operate in the same manner as described with respect to the pass-through connection between the I/O ports J1 and J3 and the shifting connection between the I/O ports J2 and J4.

The pass-through connection may be, and in some embodiments is, used to couple conductive paths on one substrate (e.g., the substrate 102-1 shown in FIG. 1) to the same conductive paths on a separate substrate (e.g., the substrate 102-2 shown in FIG. 1) with identically configured conductive paths. The pass-through connection between the I/O ports J1 and J3 is established by a plurality of conductive paths 302-1, 302-2, 302-3, 302-4, 302-5 coupling the contacts 214-1 at the I/O port J1 to corresponding contacts 214-3 at the I/O port J3. In FIG. 3, the contacts 214-1 at the I/O port J1 present electrical connections to the I/O port J3 in the same order as the contacts 214-3 at the I/O port J3 present electrical connections to the I/O port J1. In particular, a contact 1 of the I/O port J1 is coupled by a conductive path 302-1 to a contact 1 of the I/O port J3, a contact 2 of the I/O port J1 is coupled by a conductive path 302-2 to a contact 2 of the I/O port J3, a contact 3 of the I/O port J1 is coupled by a conductive path 302-3 to a contact 3 of the I/O port J3, a contact 4 of J1 is coupled by a conductive path 302-4 to a contact 4 of the I/O port J3, and a contact 5 of the I/O port J1 is coupled by a conductive path 302-5 to a contact 5 of the I/O port J3. It is to be understood that if the contacts 214-1 or 214-3 of one of the I/O ports J1 or J3 were presented in reverse order, i.e. the contact 5 positioned at the top of the I/O port J1 or J3 viewed in FIG. 3 and the contact 1 positioned at the bottom of the I/O port J1 or J3, the contacts 214-1 and 214-3 of the I/O ports J1 and J3 forming the pass-through connection would be in the same relative order.

The shifting connection may be used to couple conductive paths on one substrate (e.g., the substrate 102-1 shown in FIG. 1) to different conductive paths on a separate substrate (e.g., the substrate 102-2 shown in FIG. 1) with identically configured conductive paths. The shifting connection between the I/O ports J2 and J4 connects only some of the contacts 214-2 at the I/O port J2 to non-corresponding contacts 214-4 of the I/O port J4. In FIG. 3, the shifting connection couples a contact 1 of the I/O port J2 to a contact 1 of the I/O port J4 through conductive paths 304-1, 302-1 and 306-1, couples a contact 2 of the I/O port J2 to a contact 3 of the I/O port J4 through conductive paths 304-2, 302-2 and 306-3, couples a contact 3 of the I/O port J2 to a contact 4 of the I/O port J4 through conductive paths 304-3, 302-3, and 306-4, and couples a contact 4 of the I/O port J2 to a contact 5 of the I/O port J4 through conductive paths 304-4, 302-4 and 306-5. A contact 5 of the I/O port J2 is not coupled by the conductive path configuration 204a to the I/O port J4, and a contact 2 of the I/O port J4 is not coupled to a contact of any other port (i.e., the I/O ports J1, J2, J3, or J5). In FIG. 3, the contacts 214-2 of the I/O port J2 are presented in a different relative order compared to the contacts 214-4 of the I/O port J4.

In FIG. 3, each of contacts 214-5 of the I/O port J5 are coupled to the pass-through conductive paths 302-1, 302-2, 302-3, 302-4 and 302-5 between the I/O ports J1 and J3 by associated conductive paths 308-1, 308-2, 308-3, 308-4, 308-5, respectively. The contacts 214-5 of the I/O port J5 present connections to the conductive path configuration 204a that are, for example, useful for connecting the output channels of a multichannel power supply to the conductive path configuration 204a. The common connection and channel connections of a multichannel power supply (e.g., the multichannel power supply 101 shown in FIG. 1) may each be, and in some embodiments are, coupled to a different associated one of the contacts 214-5 of the I/O port J5.

Figure 4:
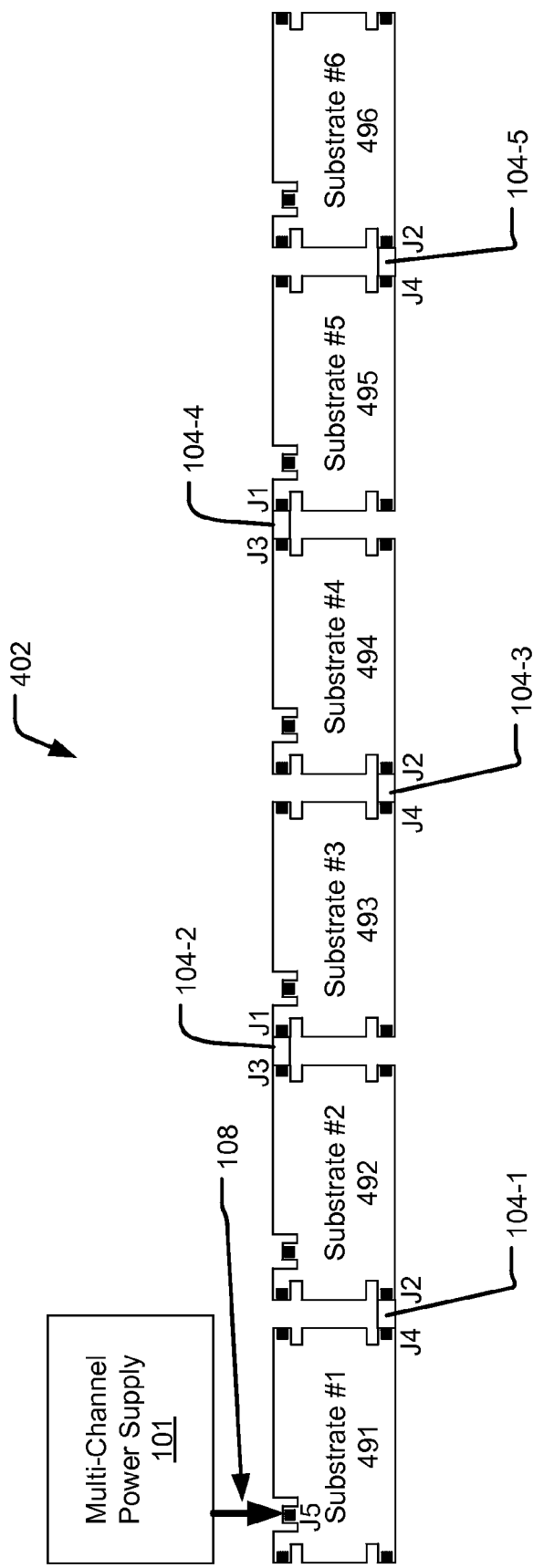
FIG. 4 diagrammatically illustrates a system including substrates like the substrate shown in FIG. 2 and including the conductive path configuration illustrated in FIG. 3 according to embodiments disclosed herein.

With reference again to FIG. 1, in the lighting system 100, two or more substrates in the plurality of substrates 102-1, 102-2 . . . 102-N, having the same configuration, may be and in some embodiments are coupled to each other by coupling an I/O port on one of the substrates in the plurality of substrates 102-1, 102-2 . . . 102-N to an I/O port on an adjacent substrate using a connector, e.g. a connector in the plurality of connectors 104-1, 104-2 . . . 104-N. This establishes an electrical connection between the conductive paths and ports on the one substrate in the plurality of substrates 102-1, 102-2 . . . 102-N with the conductive paths and ports on the adjacent substrate in the plurality of substrates 102-1, 102-2 . . . 102-N. FIG. 4 diagrammatically illustrates an electrical substrate assembly 402 that includes substrates: a substrate #1 491, a substrate #2 492, a substrate #3 493, a substrate #4 494, a substrate #5 495, and a substrate #6 496, each of which is configured in the same way as the substrate 102 shown in FIG. 2 and includes the same conductive path configuration 204a as illustrated in FIG. 3. For ease of illustration, the conductive paths of FIG. 3 are not shown in FIG. 4.

In FIG. 4, output channels 108 of a multichannel power supply 101 are coupled to the contacts of an I/O port J5 on the substrate #1 491. Contacts of an I/O port J4 on the substrate #1 491 are coupled to contacts of an I/O port J2 on the substrate #2 492 by a first connector 104-1. Contacts of an I/O port J3 on the substrate #2 492 are coupled to contacts of an I/O port J1 on the substrate #3 493 by a second connector 104-2. Contacts of an I/O port J4 on the substrate #3 493 are coupled to contacts of an I/O port J2 on the substrate #4 494 by a third connector 104-3. Contacts of an I/O port J3 on the substrate #4 494 are coupled to contacts of an I/O port J1 on the substrate #5 495 by a fourth connector 104-4. Contacts of an I/O port J4 on the substrate #5 495 are coupled to contacts of an I/O port J2 on the substrate #6 496 by a fifth connector 104-5.

Figure 5A:
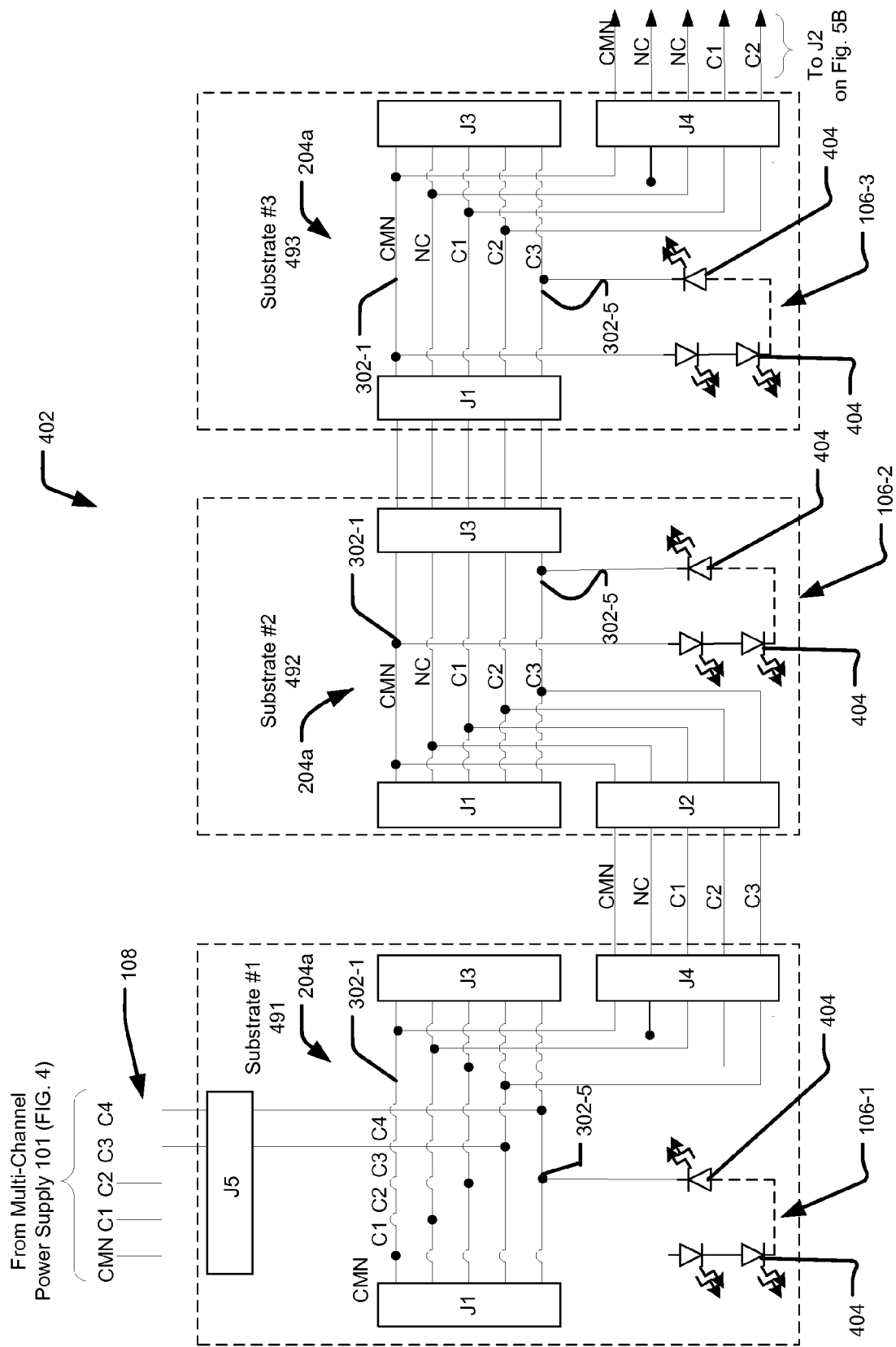
FIGS. 5A and 5B diagrammatically illustrate interconnection of the conductive path configurations in the system shown in FIG. 4 according to embodiments disclosed herein.
Figure 5B:
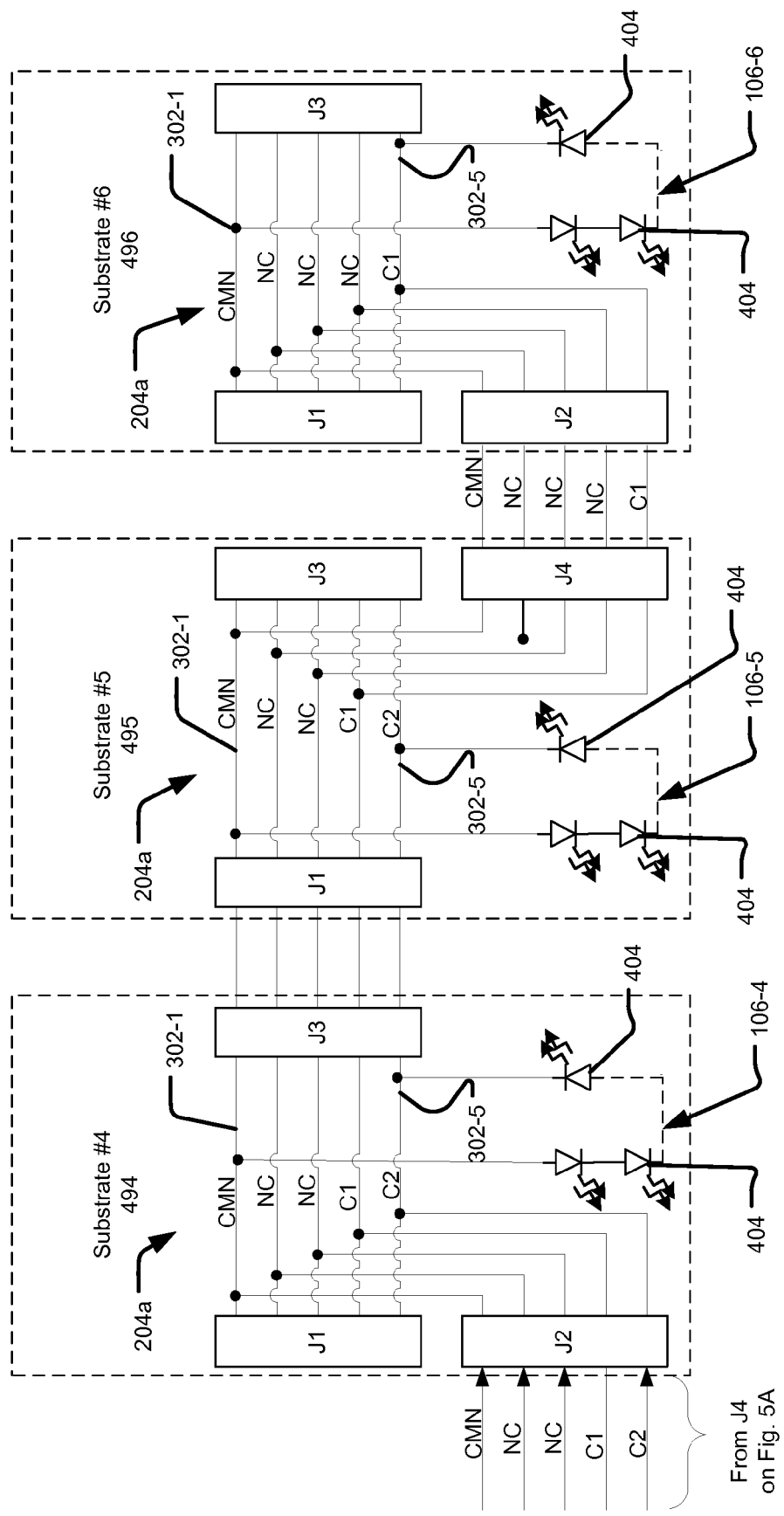

FIGS. 5A and 5B illustrate the electrical connections established by the configuration of the electrical substrate assembly 402 shown in FIG. 4, and illustrate a first solid state light source 106-1, a second solid state light source 106-2, a third solid state light source 106-3, a fourth solid state light source 106-4, a fifth solid state light source 106-5, and a sixth solid state light source 106-6 coupled to the substrate #1 491, the substrate #2 492, the substrate #3 493, the substrate #4 494, the substrate #5 495, and the substrate #6 496, respectively, and to the output channels 108 of the multichannel power supply 101. For ease of illustration, in FIGS. 5A and 5B only the portions of the conductive path configurations 204a associated with the connections between the substrate #1 491, the substrate #2 492, the substrate #3 493, the substrate #4 494, the substrate #5 495, and the substrate #6 496 are shown.

In FIGS. 5A and 5B, the output channels 108 of the multichannel power supply 101 include a common output CMN, a channel 1 output C1, a channel 2 output C2, a channel 3 output C3, and a channel 4 output C4. Each of the output channels 108 are coupled to an associated contact of the I/O port J5 on the substrate #1 491. The first solid state light source 106-1 includes a plurality of solid state light sources 404 coupled in series between the conductive paths 302-1 and 302-5 of the substrate #1 491, which carry the common output CMN and the channel 4 output C4, respectively. The solid state light source 106-4 on the substrate #1 491 is thus coupled to the channel 4 output C4 of the multichannel power supply 101.

The conductive path configuration 204a establishes a shifting connection between the I/O port J5 and the I/O port J4 of the substrate #1 491, which is coupled to the I/O port J2 of the substrate #2 492 by the first connector 104-1 in FIG. 4. As shown in FIG. 5A, the common output CMN, the channel 1 output C1, the channel 2 output C2, and the channel 3 output C3 of the multichannel power supply 101 are coupled to the I/O port J2 of the substrate #2 492. The second contact on the I/O port J4 of the substrate #1 491 has no connection NC and is coupled to the second contact of the I/O port J2 on the substrate #2 492. The conductive path configuration 204a establishes a pass-through connection between the I/O ports J2 and J3 on the substrate #2 492, coupling the contacts of the I/O port J2 to the conductive paths established between the I/O ports J1 and J3 on the substrate #2 492. The second solid state light source 106-2 includes a plurality of solid state light sources 404 coupled in series between the conductive paths 302-1 and 302-5 of the substrate #2 492, which correspond (i.e., are the same paths) to which the first solid state light source 106-1 is coupled on the substrate #1 491. Due to the shifting connection between the I/O ports J5 and J4 of the substrate #1 491, which is coupled to the I/O port J2 of the substrate #2 492, however, on the substrate #2 492, the conductive paths 302-1 and 305-1 carry the common output CMN and the channel 3 output C3 of the multichannel power supply 101. On the substrate #2 492, the second solid state light source 106-2 is thus coupled to the channel 3 output C3 of the multichannel power supply 101. Thus, although the substrate #1 491 and the substrate #2 492 have the same conductive path configurations 204a, the first solid state light source 106-1 and the second solid state light source 106-2 coupled to the same conductive paths 302-1 and 302-5 on the substrate #1 491 and the substrate #2 492, respectively, are coupled to different output channels, i.e. the output channel 4 C4 and the output channel 3 C3, respectively, of the multichannel power supply 101, due to the shifting connection between the I/O ports J5 and J4 of the substrate #1 491, which is coupled to the I/O port J2 of the substrate #2 492.

The pass-through connection between the I/O ports J2 and J3 of the substrate #2 492 is coupled to the I/O port J1 of the substrate #3 493 by the second connector 104-2 in FIG. 4. As shown in FIG. 5A, the common output CMN, the channel 1 output C1, the channel 2 output C2, and the channel 3 output C3 of the multichannel power supply 101 from the I/O port J3 on the substrate #2 492 are coupled to corresponding contacts of the I/O port J1 on the substrate #3 493. The third solid state light 106-3 source includes a plurality of solid state light sources 404 coupled in series between the conductive paths 302-1 and 302-5, which correspond to the conductive paths to which the first solid state light source 106-1 and the second solid state light source 106-2 are coupled on the substrate #1 491 and the substrate #2 492, respectively. Due to the pass-through connection paths 302-1 and 302-5 on the substrate #3 493 carrying the common output CMN and the channel 3 output C3 of the multichannel power supply 101, the third solid state light source 106-3 is thus coupled to the channel 3 output C3 of the multichannel power supply 101.

Connections to the substrate #4 494, the substrate #5 495, and the substrate #6 similarly use either a shifting connection and a connector (e.g., the connector 104-3, the connector 104-5) between an I/O port J4 and an I/O port J2 of adjacent substrates, or a pass-through connection and a connector (e.g., the connector 104-4) between an I/O port J3 and an I/O port J1 of adjacent substrates. In particular, in FIGS. 5A-5B, the connector 104-3 between the substrate #3 493 and the substrate #4 494 (spanning FIGS. 5A and 5B) couples a shifting connection on the substrate #3 493 to the substrate #4 494. The fourth solid state light source 106-4 includes a plurality of solid state light sources 404 coupled in series between the conductive paths 302-1 and 302-5 on the substrate #4 494. Due to the shifting connection, however, on the substrate #4 494, the conductive paths 302-1 and 302-5 carry the common output CMN and the channel 2 output C2 of the multichannel power supply 101, and thus the fourth solid state light source 106-4 is coupled to the channel 2 output C2 of the multichannel power supply 101.

The connector 104-4 between the substrate #4 494 and the substrate #5 495 couples a pass-through connection on the substrate #4 494 to the substrate #5 495. The fifth solid state light source 106-5 includes a plurality of solid state light sources 404 coupled in series between the conductive paths 302-1 and 305-1 on the substrate #5 495. Due to the pass-through connection, on the substrate #5 495, the conductive paths 302-1 and 305-1 carry the common output CMN and the channel 2 output C2 of the multichannel power supply 101. The fifth solid state light source 106-5 is thus coupled to the channel 2 output C2 of the multichannel power supply 101.

The connector 104-5 between the substrate #5 495 and the substrate #6 496 couples a shifting connection on the substrate #5 495 to the substrate #6 496. The sixth solid state light source 106-6 includes a plurality of solid state light sources 404 coupled in series between the conductive paths 302-1 and 305-1 on the substrate #6 496. Due to the shifting connection, however, on the substrate #6 496, the conductive paths 302-1 and 305-1 carry the common output CMN and the channel 1 output C1 of the multichannel power supply 101, and thus the sixth solid state light source 106-6 is coupled to the channel 1 output C1 of the multichannel power supply 101.

As illustrated, for example, in FIGS. 5A and 5B, a substrate is coupled to a multichannel power supply and to other substrates, by pass-through and/or shifting connections. Solid state light sources coupled to the same conductive paths on the respective substrates are thereby coupled to selected channels of the multichannel power supply. A single substrate configuration is thus utilized to achieve selective coupling of solid state light sources to different channels of a multichannel power supply. The solid state light sources are coupled to the same conductive paths on respective substrates to allow ease of assembly, and the substrates are coupled to each other through pass-through connections or shifting connections to selectively couple the solid state light sources to desired channels of the multichannel power supply.

Further, a single wiring harness may be, and in some embodiments is, used to couple a multichannel power supply to a port on one of the substrates. Board-to-board connectors may be, and in some embodiments are, used to couple substrates to each other. This avoids the expense associated with using multiple wiring harnesses to couple a multichannel power supply to multiple substrates including one or more solid state light sources.

Figure 6:
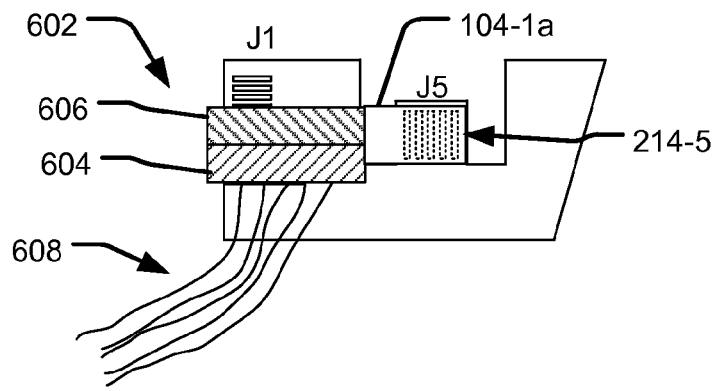
FIG. 6 illustrates a connector for coupling a multichannel power supply to a substrate according to embodiments disclosed herein.

A multichannel power supply may be, and in some embodiments is, coupled to a substrate as described throughout using any of a variety of connector configurations. One example of a connector configuration 602 for coupling a multichannel power supply to a substrate is illustrated in FIG. 6, along with a portion of the substrate 102 shown in FIG. 2, including the I/O ports J2 and J5. The connector configuration 602 includes a wiring harness 604, an interface substrate 606, and a known board-to-board connector 104-1a. The wiring harness 604 includes a plurality of conductive wires 608 coupled thereto and to associated contacts on the interface substrate 606. The plurality of conductive wires 608 may, and in some embodiments do, originate from the multichannel power supply (not shown in FIG. 6), either directly or through other components, or both. The interface substrate 606 may, and in some embodiments does, include conductive paths thereon for coupling contacts of the wire harness 604 to contacts on the board-to-board connector 104-1a. The board-to-board connector 104-1a may be, and in some embodiments is, coupled to the I/O port J5 to couple the contacts 214-5 (shown in phantom) of the I/O port J5 to associated ones of the conductive wires 608 of the multichannel power supply through the interface substrate 606.

Figure 7:
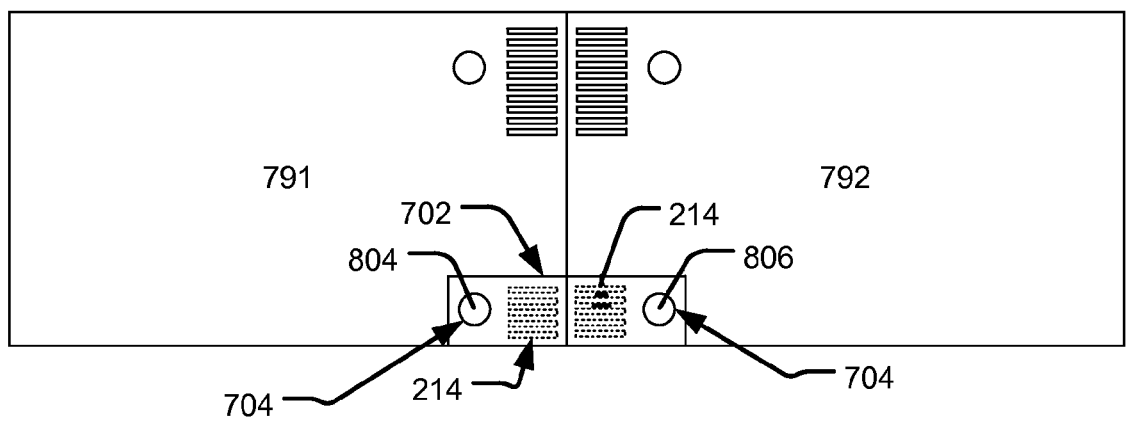
FIG. 7 shows a top view of a portion of first and second substrates coupled using a bridge connector according to embodiments disclosed herein.
Figure 8:
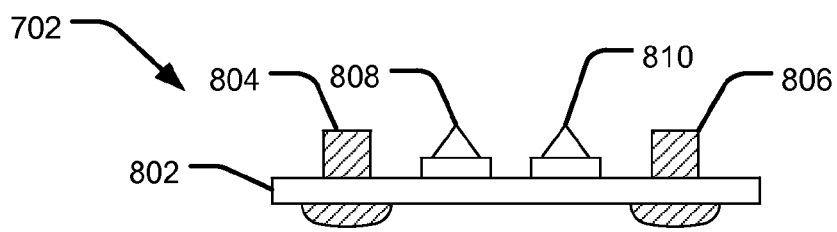
FIG. 8 is a side view of the bridge connector shown in FIG. 7 according to embodiments disclosed herein.

Substrates may be, and in some embodiments are, coupled to each other using board-to-board connectors or other connector configurations. FIGS. 7 and 8, for example, illustrate a first substrate 791 coupled to a second substrate 792 using a separate contact bridge 702. As shown in FIG. 8, the contact bridge 702 includes a substrate 802, a first fastener 804 and a second fastener 806 extending through the substrate 802, and a first contact configuration 808 and a second contact configuration 810 disposed on the substrate 802. The first contact configuration 808 and the contact configuration 810 extend outwardly from the substrate 802 and may (and in some embodiments do) include contacts corresponding to the contacts 214 (shown in phantom) on ports of the first substrate 791 and the second substrate 792. The first fastener 804 and the second fastener 806, which are illustrated as screws for example and of course are not so limited, may be and in some embodiments are passed through corresponding openings 704 in the first substrate 791 and the second substrate 792, and the first contact configuration 808 and the second contact configuration 810 may (and in some embodiments do) contact the contacts 214 of the ports on the first substrate 791 and the second substrate 792, thereby coupling the contacts 214 of the port on the first substrate 791 with the contacts 214 of the port on the second substrate 792.

Figure 9:
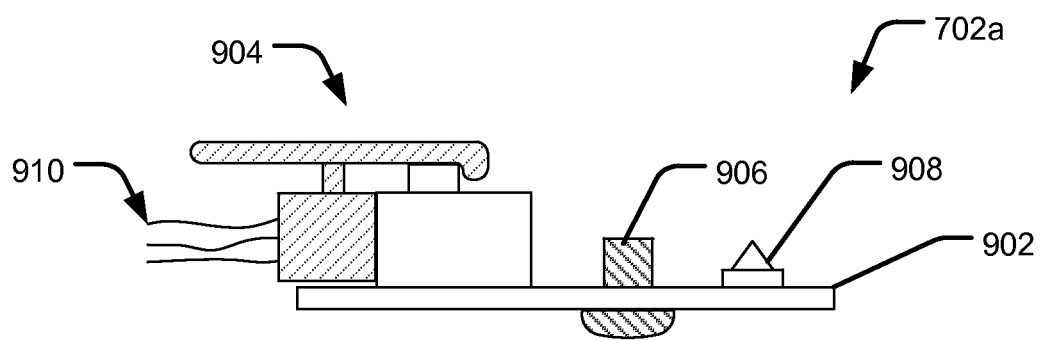
FIG. 9 is a side view of another embodiment of a bridge connector according to embodiments disclosed herein.

FIG. 9 illustrates a contact bridge configuration 702a that may be, and in some embodiments is, used to couple a multichannel power supply to a port on a substrate, e.g. the first substrate 791 of FIG. 7. The contact bridge configuration 702a includes a substrate 902, a connector 904 coupled to the substrate 902, a fastener 906 extending through the substrate 902, and a contact configuration 908 disposed on the substrate 902. The connector 904 may, and in some embodiments does, include a plurality of conductive wires 910 coupled to respective channels of the multichannel power supply and may couple the leads to associated conductive paths on the substrate 902 that are coupled to associated contacts of the contact configuration 908. The contact configuration 908 may extend outwardly from the substrate 902 and may include contacts corresponding to the contacts 214 (shown in FIG. 7) on the ports on the first substrate 791 shown in FIG. 7. The fastener 906, shown as but not limited to a screw, may be passed through a corresponding opening, e.g. the opening 704 shown in FIG. 7, in the substrate 902 and the contact configuration 908 may contact the contacts 214 of a port, thereby coupling the outputs of the multichannel power supply with the contacts 214 of the port on board.

Figure 10:
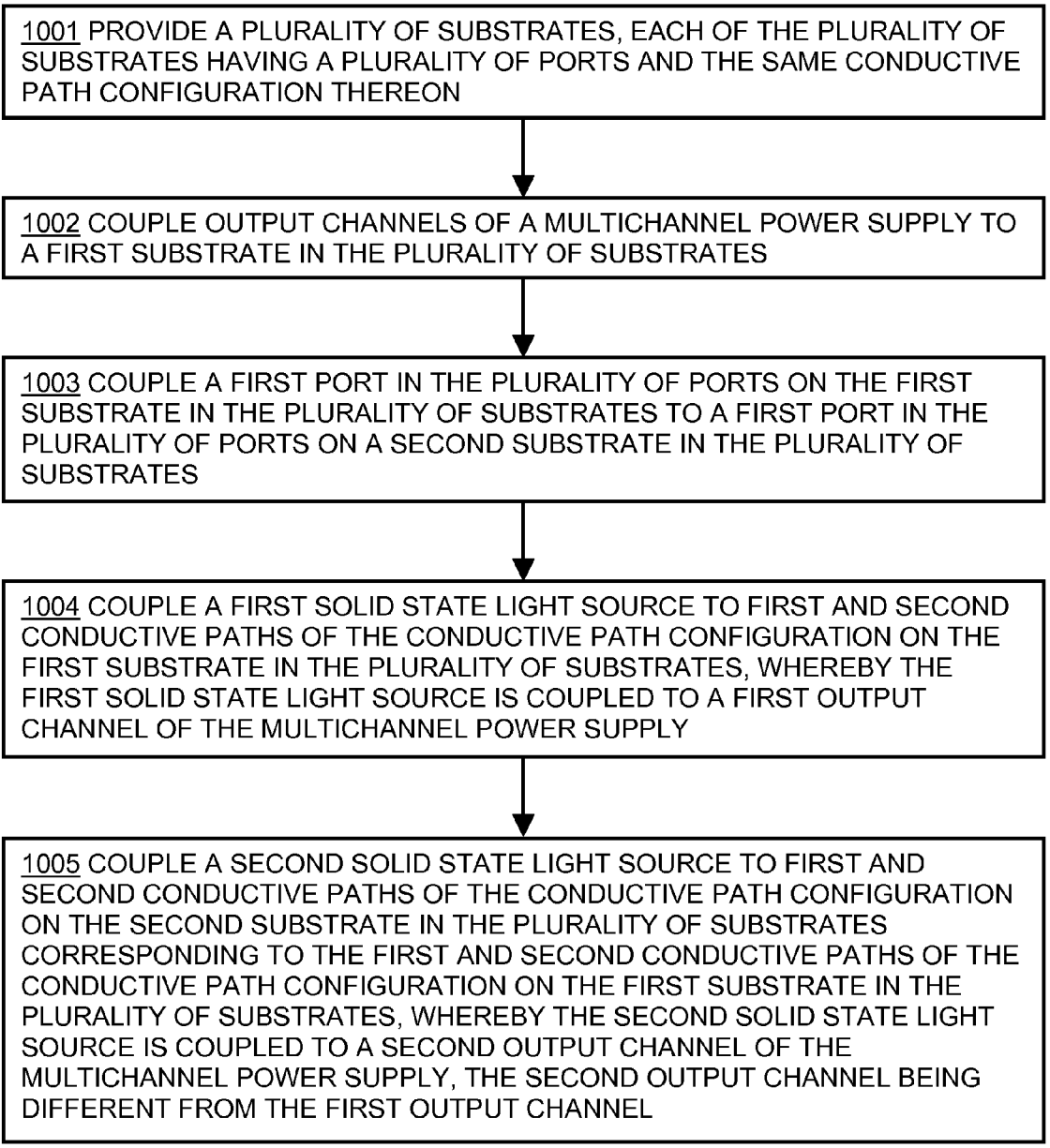
FIG. 10 is a flowchart illustrating a method according to embodiments disclosed herein.

FIG. 10 is a flowchart illustrating a method 1000 of coupling output channels of a multichannel power supply to solid state light sources. The illustrated flowchart may be shown and described as including a particular sequence of steps. It is to be understood, however, that the sequence of steps merely provides an example of how the general functionality described herein may be implemented. The steps do not have to be executed in the order presented unless otherwise indicated.

In FIG. 10, the method 1000 begins by providing a plurality of substrates, each of the plurality of substrates having a plurality of ports and the same conductive path configuration thereon, step 1001. Output channels of a multichannel power supply are coupled to a first substrate in the plurality of substrates, step 1002. A first port in the plurality of ports on the first substrate in the plurality of substrates is coupled to a first port in the plurality of ports on a second substrate in the plurality of substrates, step 1003. A first solid state light source is coupled to first and second conductive paths of the conductive path configuration on the first substrate in the plurality of substrates, whereby the first solid state light source is coupled to a first output channel of the multichannel power supply, step 1004. A second solid state light source is coupled to first and second conductive paths of the conductive path configuration on the second substrate in the plurality of substrates corresponding to the first and second conductive paths of the conductive path configuration on the first substrate in the plurality of substrates, whereby the second solid state light source is coupled to a second output channel of the multichannel power supply, the second output channel being different from the first output channel, step 1005.

In some embodiments, when coupling a first port step 1003, the plurality of ports on the first substrate in the plurality of substrates includes a first port having a first set of electrical contacts, a second port having a second set of electrical contacts, a third port having a third set of electrical contacts, and a fourth port having a fourth set of electrical contacts. The conductive path configuration establishes a pass-through connection from the first port to the third port and a shifting connection from the second port to the fourth port. The pass-through connection couples each of the first set of electrical contacts to associated ones of the third set of electrical contacts. The shifting connection couples a portion of the second set of electrical contacts to associated ones of the fourth set of electrical contacts with at least one contact of the second set of electrical contacts not being connected to any contact of the fourth set of electrical contacts. In some embodiments, the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts. Further, the first set of electrical contacts presents an associated electrical connection to the conductive path configuration in a first order relative to each other and the third set of electrical contacts presents an associated electrical connection to the conductive path configuration in a third order relative to each other, the first order being the same relative order as the third order.

In some embodiments, when coupling a first port step 1003, the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts. Further, the second set of electrical contacts presents an associated electrical connection to the conductive path configuration in a second order relative to each other and the fourth set of electrical contacts presents an associated electrical connection to the conductive path configuration in a fourth order relative to each other, the fourth order being a different order from the second order.

In some embodiments, coupling a first port step 1003 includes a fifth port having a fifth set of electrical contacts, and the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts, each contact of the fifth set of electrical contacts is coupled to the pass-through connection.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lighting assembly comprising:
a plurality of substrates, wherein:
a first substrate in the plurality of substrates comprises a plurality of first ports and a first conductive path configuration comprising a plurality of first conductive paths between the plurality of first ports; and
a second substrate in the plurality of substrates comprises a plurality of second ports and a second conductive path configuration comprising a plurality of second conductive paths between the second plurality of ports, wherein the first conductive path configuration and the second conductive path configuration are the same;
a connector coupling one of the plurality of first ports to one of the plurality of second ports;
a multichannel power supply configured to provide a plurality of outputs, each output in the plurality of outputs being coupled to an associated one of the plurality of first conductive paths;
a first light source coupled to a first conductive path of the first plurality of conductive paths, to a second conductive path of the first plurality of conductive paths, and to a first output channel of the multichannel power supply; and
a second light source coupled to a first conductive path of the second plurality of conductive paths and to a second conductive path of the second plurality of conductive paths, which correspond to the first and second conductive paths of the first plurality of conductive paths, wherein the second light source is coupled to a second output channel of the multichannel power supply, and wherein the second output channel is different from the first output channel.

2. The lighting assembly of claim 1, wherein the plurality of first ports comprises:
a first port having a first set of electrical contacts;
a second port having a second set of electrical contacts;
a third port having a third set of electrical contacts; and
a fourth port having a fourth set of electrical contacts;
wherein the first conductive path configuration establishes a pass-through connection from the first port to the third port and a shifting connection from the second port to the fourth port, wherein the pass-through connection couples each of the first set of electrical contacts to associated ones of the third set of electrical contacts, wherein the shifting connection couples a portion of the second set of electrical contacts to associated ones of the fourth set of electrical contacts with at least one contact of the second set of electrical contacts not being connected to any contact of the fourth set of electrical contacts.

3. The lighting assembly of claim 2, wherein the first set of electrical contacts presents an associated electrical connection to the first conductive path configuration in a first order relative to each other and the third set of electrical contacts presents an associated electrical connection to the first conductive path configuration in a third order relative to each other, wherein the first order is the same relative order as the third order.

4. The lighting assembly of claim 2, wherein the second set of electrical contacts presents an associated electrical connection to the first conductive path configuration in a second order relative to each other and the fourth set of electrical contacts presents an associated electrical connection to the first conductive path configuration in a fourth order relative to each other, wherein the fourth order is a different order from the second order.

5. The lighting assembly of claim 2, wherein the plurality of first ports comprises a fifth port having a fifth set of electrical contacts, wherein each contact of the fifth set of electrical contacts is coupled to the pass-through connection.

6. The lighting assembly of claim 1, wherein the multichannel power supply is coupled directly to a port in the plurality of first ports.

7. An electrical substrate comprising:
a first port having a first set of electrical contacts;
a second port having a second set of electrical contacts;
a third port having a third set of electrical contacts;
a fourth port having a fourth set of electrical contacts; and
a conductive path configuration establishing a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts.

8. The electrical substrate of claim 7, wherein the first set of electrical contacts presents an associated electrical connection to the conductive path configuration in a first order relative to each other and the third set of electrical contacts presents an associated electrical connection to the conductive path configuration in a third order relative to each other, the first order being the same relative order as the third order.

9. The electrical substrate of claim 7, wherein the second set of electrical contacts presents an associated electrical connection to the conductive path configuration in a second order relative to each other and the fourth set of electrical contacts presents an associated electrical connection to the conductive path configuration in a fourth order relative to each other, the fourth order being a different relative order from the second order.

10. The electrical substrate of claim 7, further comprising a fifth port having a fifth set of electrical contacts, each contact of the fifth set of electrical contacts being coupled to the pass-through connection.

11. A method comprising:
providing a plurality of substrates, each of the plurality of substrates having a plurality of ports and the same conductive path configuration thereon;
coupling output channels of a multichannel power supply to a first substrate in the plurality of substrates;
coupling a first port in the plurality of ports on the first substrate in the plurality of substrates to a first port in the plurality of ports on a second substrate in the plurality of substrates;
coupling a first solid state light source to first and second conductive paths of the conductive path configuration on the first substrate in the plurality of substrates, whereby the first solid state light source is coupled to a first output channel of the multichannel power supply; and
coupling a second solid state light source to first and second conductive paths of the conductive path configuration on the second substrate in the plurality of substrates corresponding to the first and second conductive paths of the conductive path configuration on the first substrate in the plurality of substrates, whereby the second solid state light source is coupled to a second output channel of the multichannel power supply, the second output channel being different from the first output channel.

12. The method of claim 11, wherein coupling a first port comprises:
coupling a first port in the plurality of ports on the first substrate in the plurality of substrates to a first port in the plurality of ports on a second substrate in the plurality of substrates, wherein the plurality of ports on the first substrate in the plurality of substrates comprises:
a first port having a first set of electrical contacts;
a second port having a second set of electrical contacts;
a third port having a third set of electrical contacts; and
a fourth port having a fourth set of electrical contacts;
wherein the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts.

13. The method of claim 12, wherein coupling a first port comprises:
coupling a first port in the plurality of ports on the first substrate in the plurality of substrates to a first port in the plurality of ports on a second substrate in the plurality of substrates, wherein the plurality of ports on the first substrate in the plurality of substrates comprises:
a first port having a first set of electrical contacts;
a second port having a second set of electrical contacts;
a third port having a third set of electrical contacts; and
a fourth port having a fourth set of electrical contacts;
wherein the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts; and
wherein the first set of electrical contacts presents an associated electrical connection to the conductive path configuration in a first order relative to each other and the third set of electrical contacts presents an associated electrical connection to the conductive path configuration in a third order relative to each other, the first order being the same relative order as the third order.

14. The method of claim 12, wherein coupling a first port comprises:
coupling a first port in the plurality of ports on the first substrate in the plurality of substrates to a first port in the plurality of ports on a second substrate in the plurality of substrates, wherein the plurality of ports on the first substrate in the plurality of substrates comprises:
a first port having a first set of electrical contacts;
a second port having a second set of electrical contacts;
a third port having a third set of electrical contacts; and
a fourth port having a fourth set of electrical contacts;
wherein the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts; and
wherein the second set of electrical contacts presents an associated electrical connection to the conductive path configuration in a second order relative to each other and the fourth set of electrical contacts presents an associated electrical connection to the conductive path configuration in a fourth order relative to each other, the fourth order being a different order from the second order.

15. The method of claim 12, wherein coupling a first port comprises:
coupling a first port in the plurality of ports on the first substrate in the plurality of substrates to a first port in the plurality of ports on a second substrate in the plurality of substrates, wherein the plurality of ports on the first substrate in the plurality of substrates comprises:
a first port having a first set of electrical contacts;
a second port having a second set of electrical contacts;
a third port having a third set of electrical contacts;
a fourth port having a fourth set of electrical contacts; and
a fifth port having a fifth set of electrical contacts;
wherein the conductive path configuration establishes a pass-through connection from the first port to the third port and a shifting connection from the second port to the fourth port, wherein the pass-through connection couples each of the first set of electrical contacts to associated ones of the third set of electrical contacts, and wherein the shifting connection couples a portion of the second set of electrical contacts to associated ones of the fourth set of electrical contacts with at least one contact of the second set of electrical contacts not being connected to any contact of the fourth set of electrical contacts; and
wherein each contact of the fifth set of electrical contacts is coupled to the pass-through connection.

* * * * *